UNITED STATES PATENT OFFICE.

HENRY BERNSTEIN, OF PHILADELPHIA, PENNSYLVANIA.

PROCESS OF MAKING CUPRAMMONIUM SOLUTION.

965,273.  Specification of Letters Patent. Patented July 26, 1910.

No Drawing.  Application filed April 12, 1910. Serial No. 555,075.

*To all whom it may concern:*

Be it known that I, HENRY BERNSTEIN, a citizen of the United States, residing in the city and county of Philadelphia, State of Pennsylvania, have invented a new and useful Process for Manufacturing Cuprammonium Solution, of which the following is a specification.

My invention relates to a new and useful process for making cuprammonium solution, at the ordinary temperature, which is employed in the manufacture of artificial silk and it consists in adding a saccharine substance such as sugar, molasses, etc., to aqua ammonia solution and bringing the same into contact with metallic copper.

It further consists in subjecting sugars to aqua ammonia, adding this to another solution of aqua ammonia and bringing the same into contact with metallic copper.

It is known that cuprammonium solution can be manufactured or made, by subjecting metallic copper to an ammonia solution and forcing air through this liquid but by this method it has only been possible to obtain about two and one-half ($2\frac{1}{2}$) per cent. of copper in solution and to retain it in the liquid. Improvements in the results obtained by this process have been made, by keeping the temperature down to a low degree, say below 5° C. One of the principal objections to this is the large expense in maintaining the low temperature, and in addition it is unhealthy and disagreeable for the workmen.

By my process, I am enabled to prepare cuprammonium solution stronger than heretofore, since it is well known that, under ordinary temperatures, a 2% solution only can be obtained, but by my process I obtain a solution of four per cent. (4%), or above, of copper, also stable at the ordinary temperature.

In carrying out my invention I prefer to take a solution of aqua ammonia and add about two per cent. (2%) of a saccharine substance, such as sugar, molasses, etc., thereto. This saccharine solution is then added to aqua ammonia, of suitable strength, and this last solution is brought into contact with the metallic copper in any form, such as strips or shavings in a suitable vessel and air is then forced through the liquid. While any suitable solution may be employed, I preferably take a strong aqua ammonia solution of about twenty per cent. (20%) strength and dissolve the saccharine substance therein to form a saccharine solution, it being understood that by saccharine I mean sugar, molasses or any other suitable or similar material. This saccharine solution is added to an aqua ammonia solution sixteen to twenty per cent. strength and this solution is then placed or brought into contact with copper strips or shavings in a suitable receptacle and I then force air through the liquid. By this method a high percentage of cellulose can be dissolved and kept stable in ordinary temperature.

No claim is made herein to the process of making cuprammonium solution wherein molasses is employed, as the same is claimed in my divisional application Serial No. 568,641, filed June 24, 1910.

Having thus described my invention, what I claim as new and desire to secure by Letters Patent, is:—

1. The process of making cuprammonium solution, which consists in subjecting metallic copper to a mixture or solution of aqua ammonia and a saccharine substance and passing a current of air through the liquid.

2. The process of making cuprammonium solution, which consists in subjecting metallic copper to a mixture or solution of aqua ammonia and a sugar, and passing a current of air through the liquid.

3. The process of making cuprammonium solution, which consists in dissolving sugar in aqua ammonia to form a sugar solution, adding the sugar solution to aqua ammonia of suitable strength, placing this solution into contact with copper strips or scraps, and then forcing air through the liquid.

HENRY BERNSTEIN.

Witnesses:
C. D. McVAY,
M. E. RINKENBACH.